United States Patent
Fujita et al.

(10) Patent No.: US 7,296,514 B2
(45) Date of Patent: Nov. 20, 2007

(54) CONVEX/CONCAVE PATTERN-FORMING STAMP, CONVEX/CONCAVE PATTERN-FORMING METHOD AND MAGNETIC RECORDING MEDIUM

(75) Inventors: Minoru Fujita, Toyko (JP); Mitsuru Takai, Tokyo (JP)

(73) Assignee: TDK Corporation, Tokyo (JP)

( * ) Notice: Subject to any disclaimer, the term of this patent is extended or adjusted under 35 U.S.C. 154(b) by 128 days.

(21) Appl. No.: 10/923,728

(22) Filed: Aug. 24, 2004

(65) Prior Publication Data

US 2005/0045583 A1 Mar. 3, 2005

(30) Foreign Application Priority Data

Aug. 26, 2003 (JP) ............... 2003-300796

(51) Int. Cl.
G11B 5/84 (2006.01)
G11B 7/26 (2006.01)
B29C 33/42 (2006.01)

(52) U.S. Cl. ............ 101/4; 264/293; 264/320
(58) Field of Classification Search ............ None
See application file for complete search history.

(56) References Cited

U.S. PATENT DOCUMENTS

| | | | |
|---|---|---|---|
| 5,772,905 A | 6/1998 | Chou | 216/44 |
| 5,820,794 A * | 10/1998 | Jung | 264/1.33 |
| 6,514,437 B1 * | 2/2003 | Higashida et al. | 264/1.33 |
| 6,748,865 B2 | 6/2004 | Sakurai et al. | 101/483 |
| 2002/0191317 A1 | 12/2002 | Yasunaga | 360/48 |
| 2004/0227263 A1 * | 11/2004 | Gorczyca et al. | 264/1.33 |
| 2005/0001343 A1 * | 1/2005 | Komaki et al. | 264/1.33 |

FOREIGN PATENT DOCUMENTS

| | | |
|---|---|---|
| CN | 1393853 | 1/2003 |
| JP | 1-196749 | 8/1989 |
| JP | 6-212457 | 8/1994 |
| JP | 10302256 A * | 11/1998 |
| JP | 10308020 A * | 11/1998 |
| JP | 2000331333 A * | 11/2000 |
| JP | 2001-250217 | 9/2001 |
| JP | 2001312844 A * | 11/2001 |
| JP | 2002-100038 | 4/2002 |

(Continued)

OTHER PUBLICATIONS

Machine translation of JP 2003217187 to Yamamoto et al. from Japanese Patent Office website.*

(Continued)

*Primary Examiner*—Daniel J. Colilla
(74) *Attorney, Agent, or Firm*—Greenblum & Bernstein, P.L.C.

(57) ABSTRACT

A convex/concave pattern-forming stamp which is capable of making recesses of a convex/concave pattern uniform in depth and preventing deformation and peeling of portions of the convex/concave pattern at the same time. The stamp has on a surface thereof an annular area formed with protrusions for forming a convex/concave pattern in a resin layer on a surface of a disk-shaped substrate by being pressed against the resin layer. Protrusions for dispersing a pressure applied to the resin layer when the stamp is pressed against the resin layer are formed in at least one of an outer area located radially outward of the annular area and an inner area located radially inward of the annular area.

4 Claims, 7 Drawing Sheets

FOREIGN PATENT DOCUMENTS

| | | |
|---|---|---|
| JP | 2002-100079 | 4/2002 |
| JP | 2003-006944 | 1/2003 |
| JP | 2003-157520 | 5/2003 |
| JP | 2003-217187 | 7/2003 |
| JP | 2003203333 A * | 7/2003 |
| JP | 2003217187 A * | 7/2003 |
| JP | 2004-504718 | 2/2004 |
| WO | 02/07199 | 1/2002 |

OTHER PUBLICATIONS

Machine translation of JP 2000-331333 to Igari from Japanese Patent Office website.*

S.Y. Chou et al., Applied Physics Letters (US), vol. 67, No. 21, Nov. 20, 1995, pp. 3114-3116.

English Language Abstract of JP 1-196749.

English language Abstract of JP 2001-250217.

English language Abstract of JP 2002- 100038.

English language Abstract of JP 2002-100079.

English language Abstract of JP 2003-157520.

English language Abstract of JP 6-212457.

English language Abstract of JP 2003-226944.

English language Abstract of JP 2003-217187.

* cited by examiner

F I G. 1
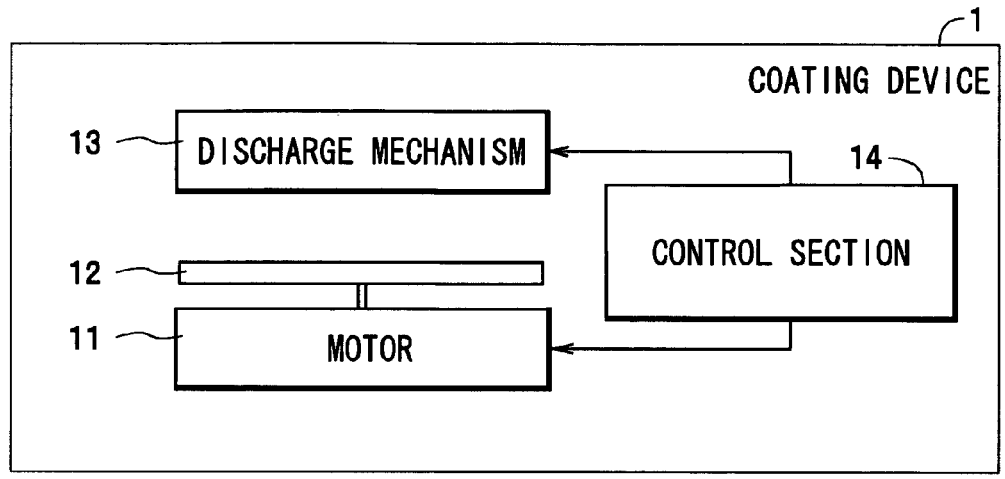
F I G. 2
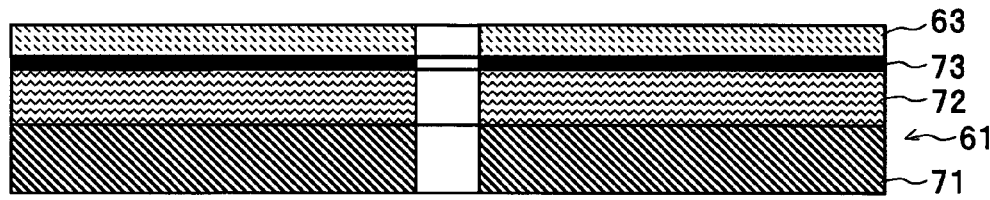
F I G. 3
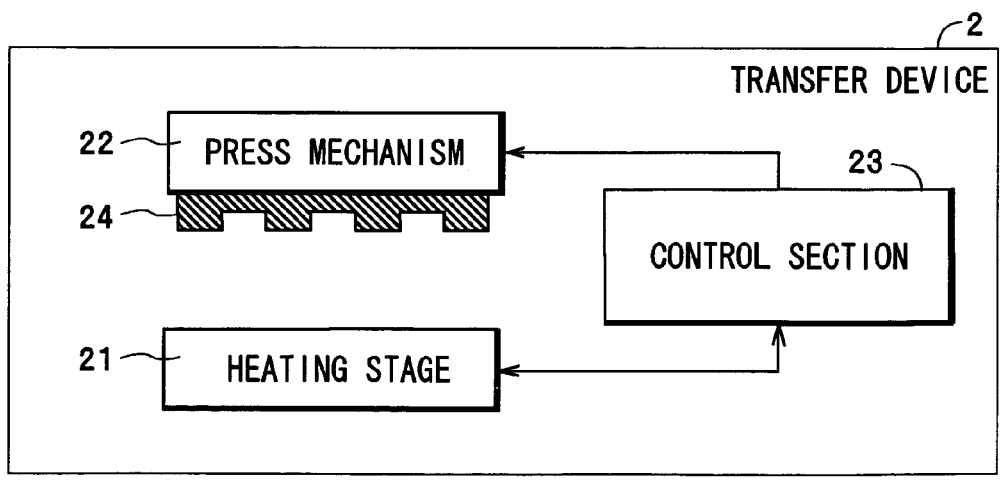

CONVEX/CONCAVE PATTERN-FORMING STAMP, CONVEX/CONCAVE PATTERN-FORMING METHOD AND MAGNETIC RECORDING MEDIUM

BACKGROUND OF THE INVENTION

1. Field of the Invention

The present invention relates to a convex/concave pattern-forming stamp that has convex/concave pattern-forming protrusions formed in a predetermined annular area of a surface thereof, for forming a convex/concave pattern in a resin layer on a substrate surface by being pressed against the resin layer, a method of forming the convex/concave pattern using the convex/concave pattern-forming stamp, and a magnetic recording medium that has data-recording tracks formed thereon using the convex/concave pattern formed according to the convex/concave pattern-forming method.

2. Description of the Related Art

In a process of manufacturing semi-conductor elements or recording media, for example, to form a fine (nanometer-sized) convex/concave pattern in a resin layer on a substrate surface, there has been proposed an imprinting method in which nanometer-sized protrusions/recesses (protrusions) formed on a stamp (mold) are pressed against a resin layer on a substrate surface to thereby transfer convex/concave shapes of the protrusions/recesses to the resin layer (Stephen Y. Chou et al., "Imprint of sub-25 nm Vias and Trenches in Polymers", Applied Physics Letters (US), vol. 67, No. 21, Nov. 20, 1995, pp. 3114-3116).

In this imprinting method, first, a stamp is prepared which has a surface thereof formed with protrusions/recesses that are nanometer-sized (with a width of 25 nm at the minimum). In this case, the protrusions/recesses of the stamp are formed by drawing a pattern on a silicon substrate having a silicon dioxide layer formed on a surface thereof, using an electron beam lithography device, and then carrying out an etching process using a reactive ion etching (RIE) device. Then, PMMA (polymethyl methacrylate) as a resin material is applied to the silicon substrate surface by a spin coating method to form a resin layer having a thickness of 55 nm. Subsequently, the stamp, the substrate, and the resin layer are heated such that the temperatures of the stamp, the substrate, and the resin layer become equal to a temperature (e.g. 200° C.) not lower than 105° C. which is the glass transition point of PMMA, whereafter the protrusions/recesses of the stamp are pressed against the resin layer with a pressure of 13.1 MPa (1900 psi). After allowing the stamp, the substrate, and the resin layer to be cooled down to room temperature, the stamp is separated from the resin layer. Thus, the convex/concave shapes of the protrusions/recesses of the stamp are transferred to the resin layer, whereby a nanometer-sized convex/concave pattern is formed in the resin layer.

On the other hand, there has been proposed a discrete track-type magnetic recording medium (hereinafter also simply referred to as "the magnetic recording medium") 91 having a plurality of data-recording discrete tracks (hereinafter simply referred to as "the discrete tracks") 92, 92, . . . formed in a track-forming area 102 on a surface of a disk-shaped substrate 101 (magnetic layer 112) as shown in FIG. 21. In the magnetic recording medium 91, the discrete tracks 92 are magnetically separated from each other by a plurality of concentric annular grooves formed in a resin layer of the disk-shape substrate 101 such that they have a convex/concave pattern, according to the imprinting method described above. The convex/concave pattern used for forming the discrete tracks 92 of the magnetic recording medium 91 is formed using a stamp 41 having nanometer-sized protrusions 51, 51, . . . formed in an annular area 43 on a surface thereof as shown in FIGS. 17 and 18. The annular area 43 is defined, as shown in FIG. 19, to have the same size as the track-forming area 102 of the disk-shaped substrate 101. In forming the convex/concave pattern using the stamp 41, according to the imprinting method described above, after forming a resin layer 103 on the surface of the disk-shaped substrate 101 comprised of, for example, a disk 111 made of glass, the magnetic layer 112, and a metal layer 113, the protrusions 51, 51, . . . of the stamp 41 are pressed against the resin layer 103 as shown in FIG. 19. As a result, as shown in FIGS. 19 and 20, the convex/concave pattern is formed in a convex/concave pattern-forming area 104 of the resin layer 103 corresponding to the annular area 43 of the stamp 41.

The present inventors have studied the above-descried conventional stamp 41, and found the following problems: As shown in FIG. 19, the stamp 41 has the protrusions 51, 51, . . . formed only in the annular area 43 which is defined to have the same size as the track-forming area 102. The stamp 41 also has an outer area 44 and an inner area 45 located radially outward and inward of the annular area 43, respectively, as shown in FIGS. 17 to 19, and neither of the two areas 44 and 45 is formed with any protrusions 51, which bring about the following inconveniences: since no protrusions are formed in the outer and inner areas 44 and 45, when the stamp 41 is pressed against the resin layer 103, there occurs concentration of pressure on an outer peripheral portion 104b (see FIG. 20) of the convex/concave pattern-forming area 104 and an inner peripheral portion 104c (see FIG. 20) of the same. For this reason, the depth of recesses (height of protrusions) formed in the outer and inner peripheral portions 104b and 104c of the convex/concave pattern-forming area 104 becomes larger than the depth of recesses (larger than the height of protrusions) formed in a central portion 104a of the convex/concave pattern-forming area 104, which makes the recesses non-uniform in depth. Further, since the pressure is concentrated on the outer and inner peripheral portions 104b and 104c of the convex/concave pattern-forming area 104, the convex/concave pattern is deformed in the outer and inner peripheral portions 104b and 104c. Moreover, there arises the problem that portions (resin material) of the convex/concave pattern in the outer and inner peripheral portions 104b and 104c adhered to the corresponding protrusions 51 of the stamp 41 are peeled off the substrate when the stamp 41 is separated from the resin layer 103. Therefore, the magnetic recording media 91 manufactured using the convex/concave pattern are formed with the discrete tracks 92 non-uniform in height (i.e. depth of the grooves separating the discrete tracks 92), and/or suffer from deformed or lost discrete tracks 92 in the outer and inner peripheral portions of the track-forming area 102, which can cause a recording error in data recording.

SUMMARY OF THE INVENTION

The present invention has been made to solve the problems described above, and a first object thereof is to provide a convex/concave pattern-forming stamp and a convex/concave pattern-forming method, which are capable of making the recesses of a convex/concave pattern uniform in depth and preventing deformation and peeling of the convex/concave pattern at the same time. Further, it is a second object of the present invention to provide a magnetic recording medium which is capable of preventing occurrence of recording error.

To attain the above first object, in a first aspect of the present invention, there is provided a convex/concave pattern-forming stamp having, on a surface thereof, a predetermined annular area formed with convex/concave pattern-forming protrusions for forming a convex/concave pattern in a resin layer on a surface of a substrate by being pressed against the resin layer, wherein pressure-dispersing protrusions for dispersing pressure applied to the resin layer when the convex/concave pattern-forming protrusions are pressed against the resin layer are formed in at least one of an outer area located radially outward of the annular area and an inner area located radially inward of the annular area.

To attain the above first object, in a second aspect of the present invention, there is provided a method of forming a convex/concave pattern, comprising the steps of forming a resin layer on a surface of a substrate, and pressing against the resin layer a convex/concave pattern-forming stamp that has convex/concave pattern-forming protrusions formed in a predetermined annular area on a surface thereof, and pressure-dispersing protrusions formed in at least one of an outer area located radially outward of the annular area and an inner area located radially inward of the annular area, to thereby form a convex/concave pattern in the resin layer by the convex/concave pattern-forming protrusions.

With the arrangement of the convex/concave pattern-forming stamp according to the first aspect of the present invention and the arrangement of the convex/concave pattern-forming method according to the second aspect of the present invention, the pressure-dispersing protrusions are formed in at least one of the outer area located radially outward of the annular area and the inner area located radially inward of the annular area. Therefore, pressure applied to the resin layer via the convex/concave pattern-forming stamp when the stamp is pressed against the resin layer can be dispersed to a part of the resin layer corresponding to the annular area of the convex/concave pattern-forming stamp, and a part of the resin layer corresponding to the outer area (or the inner area) of the convex/concave pattern-forming stamp, so that substantially uniform pressure can be applied to the entire area of the resin layer to be formed with the convex/concave pattern. As a result, the recesses substantially uniform in depth (and protrusions substantially uniform in height) can be formed in the area to be formed with the convex/concave pattern. Further, since concentration of pressure on the outer and inner peripheral portions of the area to be formed with the convex/concave pattern can be prevented, deformation of the convex/concave pattern in these portions of the resin layer and peeling of the pattern which could occur when the convex/concave pattern-forming stamp is separated from the resin layer can be positively prevented.

Preferably, the pressure-dispersing protrusions are formed in both of the outer area and the inner area. With this arrangement of the preferred embodiment, the pressure applied to the resin layer when the convex/concave pattern-forming stamp is pressed against the resin layer can be dispersed to both of the respective parts of the resin layer corresponding to the outer area and the inner area of the stamp. Therefore, it is possible to more uniformly apply pressure to the entirety of the area to be formed with the convex/concave pattern than when pressure-dispersing protrusions are additionally formed in only one of the outer area and the inner area. This makes it possible to make the recesses more uniform in depth.

Preferably, the pressure-dispersing protrusions are formed such that the pressure-dispersing protrusions each have the same or substantially the same shape as each of the convex/concave pattern-forming protrusions. With this arrangement of the preferred embodiment, the convex/concave pattern-forming protrusions and the pressure-dispersing protrusions can be formed by continuous processing under the same processing conditions in manufacturing the convex/concave pattern-forming stamp. This makes it possible to shorten the processing time, thereby reducing manufacturing costs of the convex/concave pattern-forming stamp.

Preferably, the pressure-dispersing protrusions are formed at a location spaced from the annular area by a predetermined radial distance. With this arrangement of the preferred embodiment, the area for forming the pressure-dispersing protrusions can be reduced, so that the processing area of the stamp can also be reduced by the reduced part of the area for forming the pressure-dispersing protrusions in manufacturing the convex/concave pattern-forming stamp. This makes it possible to reduce processing costs of the convex/concave pattern-forming stamp.

To attain the above second object, in a third aspect of the present invention, there is provided a magnetic recording medium formed with data-recording tracks, wherein the data-recording tracks are formed using a convex/concave pattern formed in a resin layer on a surface of a substrate by convex/concave pattern-forming protrusions by pressing against the resin layer a convex/concave pattern-forming stamp that has the convex/concave pattern-forming protrusions formed in a predetermined annular area on a surface thereof, and pressure-dispersing protrusions formed in at least one of an outer area located radially outward of the annular area and an inner area located radially inward of the annular area.

To attain the above second object, in a fourth aspect of the present invention, there is provided a magnetic recording medium comprising data-recording tracks formed in an annular area on a surface thereof, the annular area having a predetermined width, and non-data-recording pattern formed in at least one of an outer area located radially outward of the annular area and an inner area located radially inward of the annular area.

With the respective arrangements of the magnetic recording media according to the third and fourth aspects of the present invention, the data-recording tracks and the non-data-recording pattern are formed e.g. using the convex/concave pattern-forming stamp according to the first aspect of the invention described above. Therefore, in the magnetic recording media, a convex/concave pattern is formed in the resin layer in a state where pressure applied to the resin layer via the convex/concave pattern-forming stamp when the stamp is pressed against the resin layer is dispersed to a part of the resin layer corresponding to the annular area of the convex/concave pattern-forming stamp, and a part of the resin layer corresponding to the outer area (or the inner area) of the convex/concave pattern-forming stamp, i.e. in a state where substantially uniform pressure is applied to the entire area of the resin layer to be formed with the convex/concave pattern. Therefore, according to the magnetic recording media, the data-recording tracks are formed, without being deformed or peeled, what is more with substantially uniform height (with substantially uniform depth of grooves separating the tracks), which makes it possible to positively prevent occurrence of a recording error.

It should be noted that the present disclosure relates to the subject matter included in Japanese Patent Application No.

2003-300796 filed Aug. 26, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein:

FIG. 1 is a block diagram showing the arrangement of a coating device;

FIG. 2 is a cross-sectional view of a disk-shaped substrate having a resin layer formed thereon;

FIG. 3 is a block diagram showing the arrangement of a transfer device;

DESCRIPTION OF THE PREFERRED EMBODIMENTS

The best modes of the convex/concave pattern-forming stamp, the convex/concave pattern-forming method, and the magnetic recording medium according to the present invention will now be described in detail with reference to the accompanying drawings showing preferred embodiments thereof.

First of all, the configurations of a coating device 1 and a transfer device 2 will be described with reference to drawings.

Figure 15:
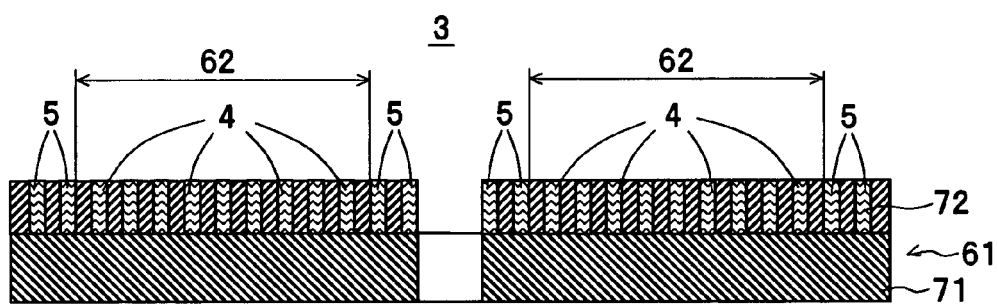
FIG. 15 is a cross-sectional view of a magnetic recording medium.

Referring first to FIG. 1, the coating device 1 is used in applying a resin material onto a surface of a disk-shaped substrate 61 (see FIG. 2), according to the convex/concave pattern-forming method of the present invention, to thereby form a resin layer 63 thereon (see FIG. 2), and is comprised of a motor 11, a turntable 12, a discharge mechanism 13, and a control section 14. The motor 11 rotates the turntable 12 in response to a control signal from the control section 14. The turntable 12 is formed such that the disk-shaped substrate 61 can be placed thereon, and is rotated by the motor 11. The discharge mechanism 13 discharges the resin material (e.g. a polystyrene-based copolymer) onto an inner peripheral portion (portion slightly radially outward of a hole formed in the center) of the disk-shaped substrate 61 placed on the turntable 12, in response to a control signal from the control section 14. The control section 14 controls rotation of the motor 11 and discharge of the resin material by the discharge mechanism 13 such that the resin layer 63 is formed to have a predetermined thickness (e.g. 65 nm (nanometers)). The disk-shaped substrate 61 is for a magnetic recording medium 3 shown in FIG. 15. As shown in FIG. 2, the disk-shaped substrate 61 is e.g. comprised of a glass disk 71, and a magnetic layer 72 and a metal layer 73 formed on the surface of the glass disk 71 in advance. In this case, as shown in FIG. 15, a plurality of concentric discrete tracks (corresponding to data-recording tracks in the present invention) 4, 4, . . . separated from each other at a predetermined pitch (e.g. 150 nm) are formed in a track-forming area 62 of the disk-shaped substrate 61 (magnetic layer 72), whereby the magnetic recording medium 3 is produced. It should be noted that an orientation layer, a soft magnetic layer, and a base layer are actually formed between the disk 71 and the magnetic layer 72, but illustration and description thereof are omitted for ease of understanding of the present invention.

The transfer device 2 is for forming an convex/concave pattern in the resin layer 63 formed on the surface of the disk-shaped substrate 61 according to the convex/concave pattern-forming method of the present invention. As shown in FIG. 3, the transfer device 2 is comprised of a heating stage 21, a press mechanism 22, a control section 23, and a stamp 24. The heating stage 21 is formed such that the disk-shaped substrate 61 can be placed thereon, and heats the resin layer 63 and the disk-shaped substrate 61 in response to a control signal from the control section 23. The press mechanism 22 to which the stamp 24 can be fixedly attached presses the stamp 24 (downward) against the heating stage 21 in response to a control signal from the control section 23. In the present embodiment, the press mechanism 22 has a heating capability of heating the stamp 24 fixed thereto. The control section 23 controls heating operation by the heating stage 21, and heating operation and pressing operation by the press mechanism 22.

Figure 4:
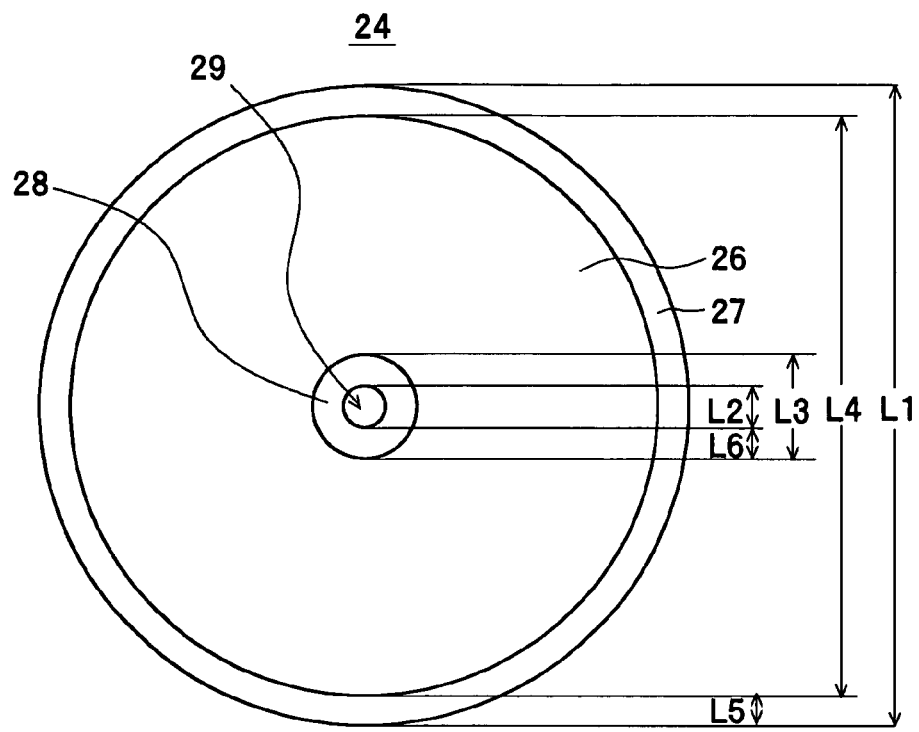
FIG. 4 is a plan view of a stamp.
Figure 5:
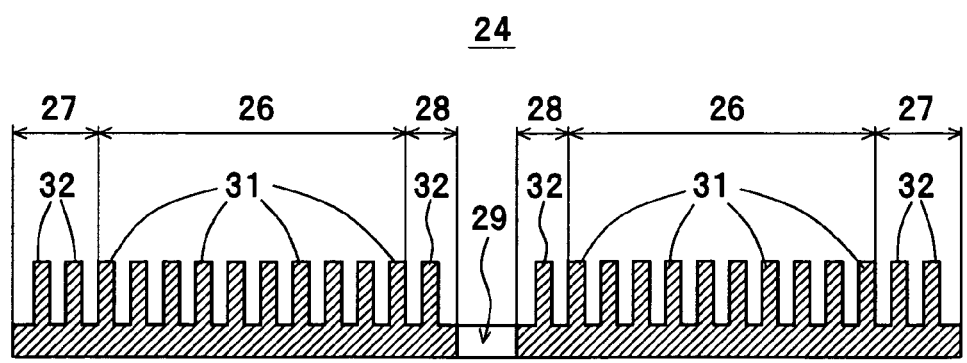
FIG. 5 is a cross-sectional view of the stamp.
Figure 10:
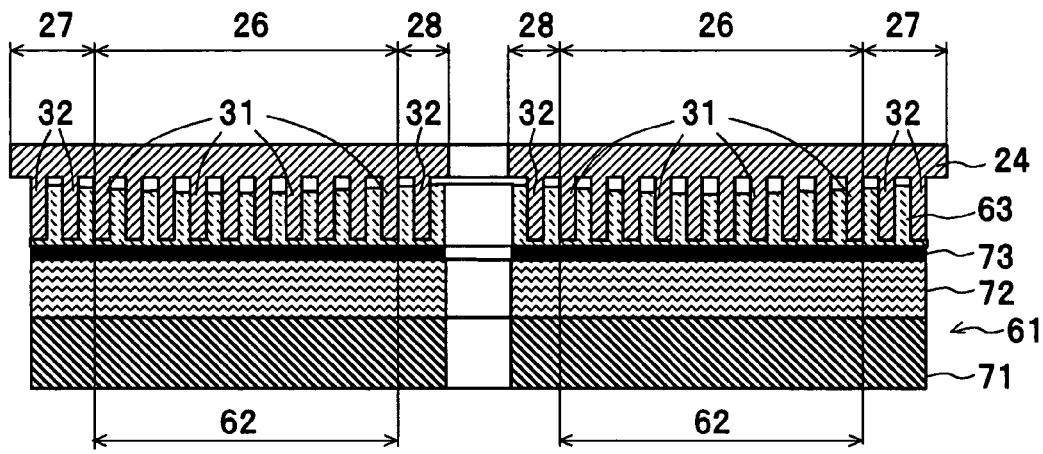
FIG. 10 is a cross-sectional view of the stamp in a state having been pressed against the resin layer.

The stamp 24 corresponds to the convex/concave pattern-forming stamp according to the present invention. As shown in FIG. 4, the stamp 24 is formed e.g. of silicon carbide such that it is generally disk-shaped. The outer diameter L1 of the stamp 24 is defined to be slightly larger than that of the disk-shaped substrate 61, i.e. equal to e.g. 22.0 mm. Further, the stamp 24 has a central portion thereof formed with a central hole 29 (through which is inserted a clamping jig for clamping the stamp 24 on the press mechanism 22) having a diameter L2 of e.g. 6.0 mm. On the surface of the stamp 24, there are defined an annular area 26, an outer area 27, and an inner area 28. As shown in FIG. 5, in the annular area 26, there are formed protrusions 31, 31, . . . for forming the convex/concave pattern in the resin layer 63. The protrusions 31, 31, . . . corresponding to convex/concave pattern-forming protrusions in the present invention are concentrically formed around the center of the stamp 24 at a predetermined pitch (e.g. 150 nm). Further, as shown in FIG. 10, the annular area 26 is defined to have approximately the same size as the track-forming area 62 of the disk-shaped substrate 61. More specifically, the annular area 26 is defined, as shown in FIG. 4, as an area having an inner diameter L3 of e.g. 8.0 mm and an outer diameter L4 of e.g. 18.0 mm. It should be noted that in FIG. 4, the areas 26 to 28 are illustrated in a different proportion therebetween from an actual one for ease of understanding of the present invention. Similarly, in FIG. 5, the protrusions 31 and protrusions 32, referred to hereinafter, are each illustrated in an exaggerated manner, i.e. with a larger size than the actual size.

As shown in FIG. 4, the outer area 27 is located radially outward of the annular area 26 on the surface of the stamp 24, and defined as an annular area having a width L5 of e.g. 2.0 mm. Further, as shown in FIG. 5, in the outer area 27, a plurality of protrusions (corresponding to pressure-dispersing protrusions in the present invention) 32, 32, . . . each identical in shape to the protrusion 31 are concentrically formed at the same pitch as that of the protrusions 31. The inner area 28 is located radially inward of the annular area 26 on the surface of the stamp 24, as shown in FIG. 4, and defined as an annular area having a width L6 of e.g. 1.0 mm. As shown in FIG. 5, also in the inner area 28, a plurality of the protrusions 32, 32, . . . (only one of which is shown in FIG. 5) are concentrically formed at the same pitch as that of the protrusions 31. The protrusions 32 formed in the outer area 27 and the inner area 28 have the function of dispersing pressure applied to the resin layer 63 via the stamp 24 when the stamp 24 is pressed against the resin layer 63 by the press mechanism 22, as described hereinafter, between a convex/concave pattern-forming area 64 (see FIG. 11), an outer peripheral part 65 (see FIG. 11), and an inner peripheral part 66 (see FIG. 11) of the resin layer 63, corresponding, respectively, to the annular area 26, the outer area 27, and the inner area 28 of the stamp 24, to thereby make substantially uniform the pressure applied to the convex/concave pattern-forming area 64.

Figure 6:
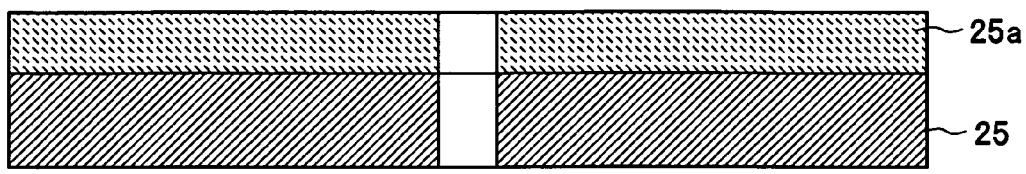
FIG. 6 is a cross-sectional view of a substrate having a resin layer formed thereon.
Figure 7:
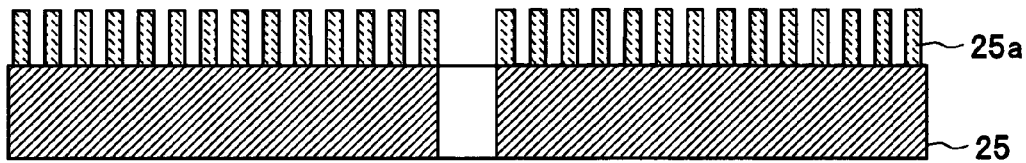
FIG. 7 is a cross-sectional view of the substrate having a convex/concave pattern formed in the resin layer.
Figure 8:
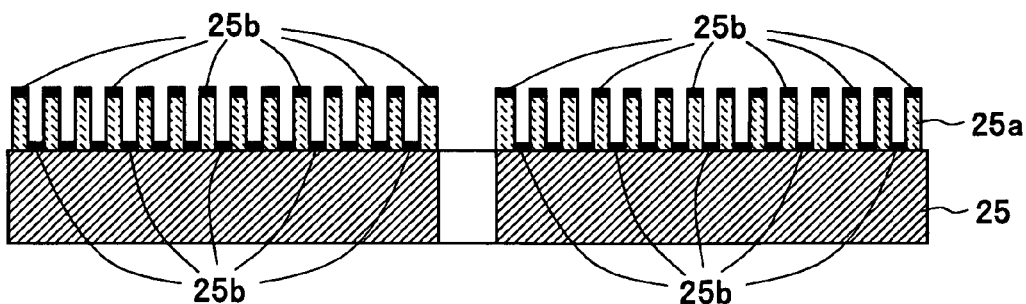
FIG. 8 is a cross-sectional view of the substrate having a nickel layer formed thereon.
Figure 9:
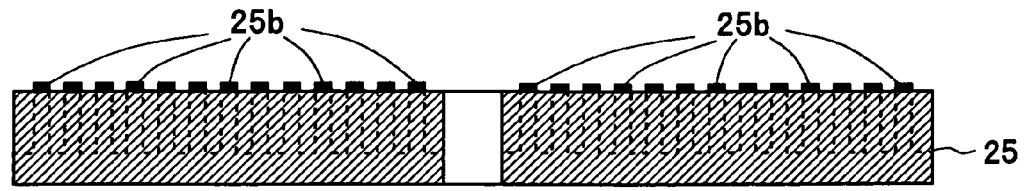
FIG. 9 is a cross-sectional view of the substrate having been subjected to a lift-off process.

The stamp 24 is produced e.g. by a dry etching method using a mask. More specifically, as shown in FIG. 6, a resin material is applied onto a surface of a disk-shaped substrate 25 made of silicon carbide, whereby a resin layer 25a is formed on the substrate 25. Then, a pattern obtained by inverting the pattern of the protrusions 31 and 32 is drawn on the resin layer 25a e.g. using an electron beam lithography device. Subsequently, the resin layer 25a is subjected to a development process. As a result, the convex/concave pattern inverted from the pattern of the protrusions 31 and 32 is formed in the resin layer 25a, as shown in FIG. 7. Then, as shown in FIG. 8, a nickel layer 25b is formed on the respective bottoms of recesses of the convex/concave pattern (i.e. the surface of the substrate 25) and on the top surfaces of the protrusions of the same by vapor deposition. Thereafter, portions of the nickel layer 25b formed on the top surfaces of the protrusions are removed together with resin material by a lift-off process. As a result, portions of the nickel layer 25b formed on the respective bottoms of the recesses form a nickel pattern on the surface of the substrate 25 as shown in FIG. 9. Then, a dry etching process is carried out using the nickel pattern as a mask. Thus, portions where the nickel pattern is not formed are removed as indicated by broken lines in FIG. 9, whereby the stamp 24 formed with the protrusions 31 and 32 is completed as shown in FIG. 5.

Next, a process for forming the convex/concave pattern according to the convex/concave pattern-forming method of the present invention will be described in detail with reference to drawings.

First, the disk-shaped substrate 61 is placed on the turntable 12, and operation of the coating device 1 is started. As the coating device 1 is started, the control section 14 delivers the control signals to the motor 11 and the discharge mechanism 13, respectively. In this case, the motor 11 causes the turntable 12 to be rotated e.g. only five turns at a low speed in response to the control signals, and the discharge mechanism 13 discharges the resin material (polystyrene-based copolymer in the present embodiment) in a predetermined amount (amount required for forming the resin layer 63 such that the resin layer 63 has a thickness of 65 nm) onto the central portion of the disk-shaped substrate 61. Then, the control section 14 delivers to the motor 11 control signals for rotating the turntable 12 at a high speed over a predetermined time period. In response to the control signals, the motor 11 rotates the turntable 12 at the high speed. In accordance with the rotation of the turntable 12, the disk-shaped substrate 61 is rotated at the high speed, and centrifugal force generated by the high-speed rotation of the disk-shaped substrate 61 causes the discharged resin material to spread with a uniform thickness toward the outer periphery of the disk-shaped substrate 61. As a result, the resin layer 63 with the thickness of 65 nm is formed on the surface of the disk-shaped substrate 61 (metal layer 73), as shown in FIG. 2.

Then, the stamp 24 is mounted on the press mechanism 22. Then, the disk-shaped substrate 61 formed thereon with the resin layer 63 is placed on the heating stage 21, and the transfer device 2 is caused to start processing. With the start of the processing by the transfer device 2, the control section 23 delivers to the heating stage 21 and the press mechanism 22 control signals for instructing the heating stage 21 and the press mechanism 22 to start heating. In response to the signals, the heating stage 21 heats the resin layer 63 and the disk-shaped substrate 61, and the press mechanism 22 heats the stamp 24. Then, the control section 23 monitors e.g. output signals from temperature sensors (not shown) to thereby check the respective temperatures of the resin layer 63, the disk-shaped substrate 61, and the stamp 24. When the temperatures have reached a temperature (e.g. 170° C.) which is equal to or higher than the glass transition point of the resin material, the control section 23 delivers to the press mechanism 22 a control signal for instructing the same to press the stamp 24. In response to the control signal, the press mechanism 22 presses the stamp 24 with a pressure of e.g. 80 kgf/cm$^2$.

Figure 11:
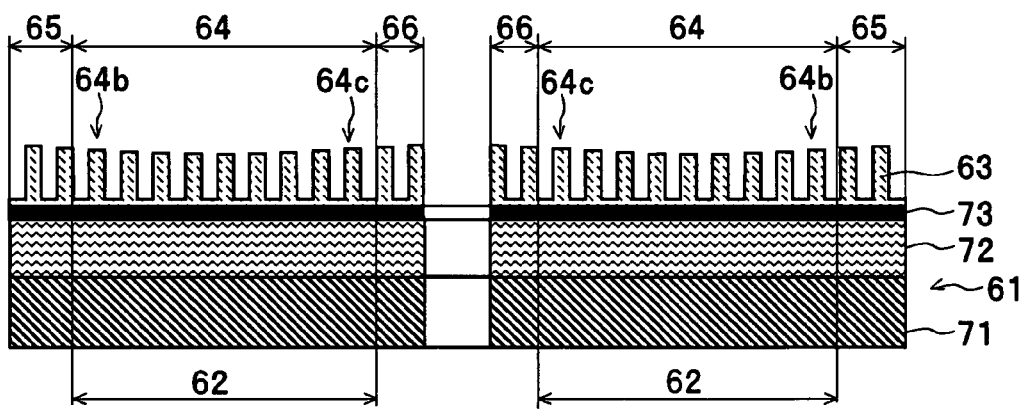
FIG. 11 is a cross-sectional view of the disk-shaped substrate having a convex/concave pattern formed in the resin layer.

In this operation, the protrusions 31, 31, . . . and 32, 32, . . . of the stamp 24 are pressed against the resin layer 63, as shown in FIG. 10, to thereby deform the resin material forming the resin layer 63. In this case, since the outer area 27 and the inner area 28 have the protrusions 32 formed thereon as shown in FIG. 10, the pressure applied by the press mechanism 22 is dispersed between the convex/concave pattern-forming area 64, the outer peripheral part 65, and the inner peripheral part 66 (see FIG. 11) of the resin layer 63. This causes substantially uniform pressure to be applied to the entire convex/concave pattern-forming area 64. Subsequently, the control section 23 delivers to the press mechanism 22 a control signal for instructing the same to stop the pressing operation, and at the same time delivers to the heating stage 21 and the press mechanism 22 control signals for instructing them to stop the heating operation. In response to the control signals, the heating stage 21 stops the heating operation, and the press mechanism 22 stops the pressing operation and the heating operation. Thereafter, the resin layer 63, the disk-shaped substrate 61, and the stamp 24 are left standing to allow the temperatures thereof to lower to e.g. 35° C. In this case, a method may be employed which uses a cooling mechanism to forcibly lower the temperatures. Then, the stamp 24 is separated from the resin layer 63. As a result, as shown in FIG. 11, a convex/concave pattern is formed in the convex/concave pattern-forming area 64 of the resin layer 63 by transfer of the shape of each protrusion 31 thereto, and convex/concave patterns are also formed in the outer peripheral part 65 and the inner peripheral part 66 of the resin layer 63 by transfer of the shape of each protrusion 32 thereto. In this case, since the substantially uniform pressure is applied to the entire convex/concave pattern-forming area 64 during the pressing operation, recesses substantially uniform in depth (and protrusions substantially uniform in height) are formed in the area 64. Further, since pressure is not concentrated on an outer peripheral portion 64*b* and an inner peripheral portion 64*c* of the convex/concave pattern-forming area 64, it is possible to positively prevent deformation of the convex/concave pattern in the outer peripheral portion 64*b* and the inner peripheral portion 64*c* and peeling of the convex/concave pattern during separation of the stamp 24.

Convex/concave patterns formed using the stamp 24 according to the convex/concave pattern-forming method were observed by a scanning electron microscope. Further, a convex/concave pattern formed using a stamp (conventional stamp 41) having no protrusions formed in its outer and inner peripheral areas, under the same conditions as employed in the case of the stamp 24, was observed by the scanning electron microscope. As a result, it was found that in the case of the convex/concave patterns formed using the stamp 24, recesses substantially uniform in depth (protrusions substantially uniform in height) were formed in the convex/concave pattern-forming area 64. Further, no deformation or peeling of the convex/concave pattern was observed in the outer peripheral portion 64*b* or the inner peripheral portion 64*c* of the convex/concave pattern-forming area 64. On the other hand, in the case of the convex/concave pattern formed using the conventional stamp 41, the outer and inner peripheral portions of a convex/concave pattern-forming area were formed with recesses with larger depths than those of recesses in the central part of the convex/concave pattern-forming area. Further, deformation and peeling of the convex/concave pattern were observed in the outer and inner peripheral portions of the convex/concave pattern-forming area. It is obvious from these results that the use of the stamp 24 having the outer and inner peripheral areas 27 and 28 thereof formed with the protrusions 32 makes it possible to form a convex/concave pattern having recesses (protrusions) substantially uniform in depth (height).

Next, a description will be given of the step of manufacturing the magnetic recording medium 3 by forming the discrete tracks 4 on the disk-shaped substrate 61 (magnetic layer 72) using the convex/concave pattern formed in the resin layer 63.

Figure 12:
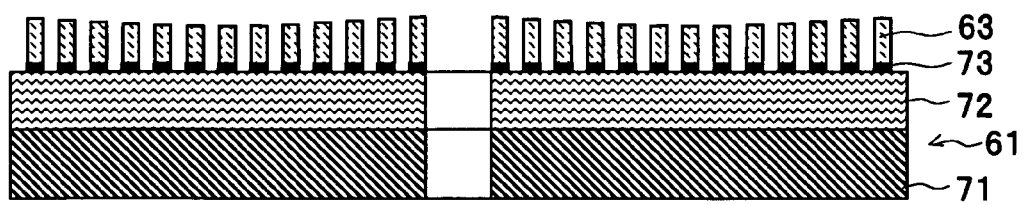
FIG. 12 is a cross-sectional view of the disk-shaped substrate in a state where portions of a metal layer have been removed from the respective bottoms of recesses of the convex/concave pattern formed in the resin layer.
Figure 13:
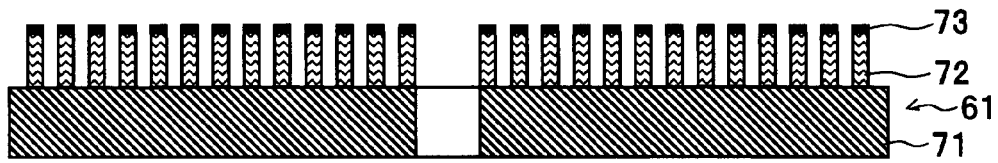
FIG. 13 is a cross-sectional view of the disk-shaped substrate in a state where a magnetic layer has been subjected to an etching process.
Figure 14:
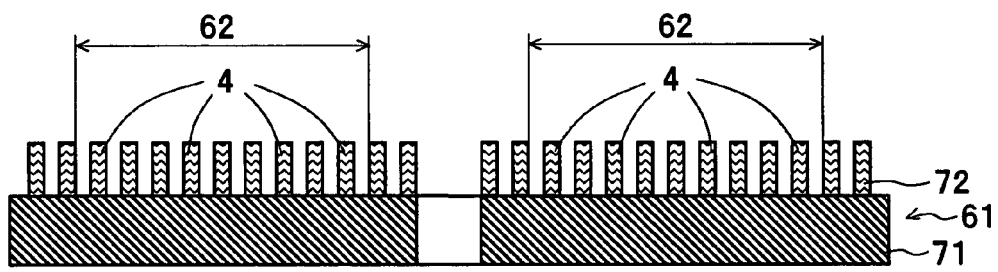
FIG. 14 is a cross-sectional view of the disk-shaped substrate in a state where discrete tracks have been formed in the magnetic layer.

First, resin material remaining in the recesses in the convex/concave pattern in the resin layer 63 is removed by oxygen plasma treatment. Then, an etching process using a gas for metal etching is performed using the convex/concave pattern (protrusions) as a mask. In doing this, portions of the metal layer 73 under the respective bottoms of the recesses of the convex/concave pattern are removed as shown in FIG. 12. Then, an etching process using a gas for magnetic material is performed using remaining portions of the metal layer 73 as a mask. As a result, portions of the magnetic layer 72, from which corresponding portions of the metal layer 73 have been removed, are etched off as shown in FIG. 13. Then, an etching process using the gas for metal etching is performed to remove the remaining portions of the metal layer 73. As a result, as shown in FIG. 14, grooves are concentrically formed in the annular track-forming area 62 (corresponding to an annular area in the present invention) of the magnetic layer 72 (disk-shaped substrate 61), at the same pitch as the pitch of the protrusions 31 of the stamp 24, whereby portions of the magnetic layer 72, i.e. the discrete tracks 4, separated from each other by the respective grooves are formed. At the same time, grooves arranged at the same pitch as the pitch of the protrusions 32 of the stamp 24 are formed in the outer peripheral part 65 (corresponding to an outer peripheral part in the present invention), which is located radially outward of the track-forming area 62, and in the inner peripheral part 66, which is located radially inward of the track-forming area 62, of the magnetic layer 72 (disk-shaped substrate 61), whereby portions of the magnetic layer 72 separated from each other by the respective grooves, i.e. non-data recording patterns 5, are formed. Then, a surface finishing process is performed. In this process, first, the grooves are filled e.g. with silicon oxide, whereafter the surface is flattened using a CMP (Chemical Mechanical Polish) device. Then, a protective film is formed on the flattened surface by using DLC (Diamond Like Carbon), and finally, a lubricant is applied to the surface. Thus, the magnetic recording medium 3 is completed as shown in FIG. 15. In this case, since the recesses (protrusions) of the convex/concave pattern in the resin layer 63 are substantially uniform in depth (height), the discrete tracks 4 are also formed such that they are substantially uniform in height (i.e. substantially uniform in depth of the grooves separating the tracks). Further, since deformation or peeling of the pattern in the outer and inner peripheral portions 64*b* and 64*c* of the convex/concave pattern-forming area 64 is prevented, the discrete tracks 4 are formed without being deformed or lost, and therefore, an excellent magnetic recording medium 3 which does not cause a recording error can be manufactured.

As described above, according to the convex/concave pattern-forming method and the stamp 24, since the protrusions 32 are formed in both of the outer area 27 located radially outward of the annular area 26 and the inner area 28 located radially inward of the annular area 26, pressure applied to the resin layer 63 when the stamp 24 is pressed against the resin layer 63 can be dispersed between the convex/concave pattern-forming area 64, the outer peripheral part 65, and the inner peripheral part 66, of the resin layer 63, so that substantially uniform pressure can be applied to the entire convex/concave pattern-forming area 64. As a result, the recesses substantially uniform in depth (and protrusions substantially uniform in height) can be formed in the convex/concave pattern-forming area 64. Further, since concentration of pressure on the outer and inner peripheral portions 64*b* and 64*c* of the convex/concave pattern-forming area 64 can be positively prevented, deformation and peeling of the convex/concave pattern in the outer peripheral portion 64*b* and the inner peripheral portion 64*c* can also be positively prevented.

Further, according to the convex/concave pattern-forming method and the stamp 24, since the protrusions 32 are formed in both of the outer area 27 and the inner area 28, the pressure applied to the resin layer 63 when the stamp 24 is pressed against the resin layer 63 can be dispersed to both of the outer peripheral part 65 and the inner peripheral part 66. Therefore, it is possible to more uniformly apply pressure to the convex/concave pattern-forming area 64 than when a method is employed which uses a stamp having protrusions 32 formed in only one of the outer area 27 and the inner area 28, whereby the recesses are made more uniform in depth.

Furthermore, according to the convex/concave pattern-forming method and the stamp 24, the protrusions 31 and 32 are each formed such that they have the same shape as that of the protrusions 31 and arranged at the same pitch, so that it is possible to continuously draw a pattern on the resin layer 25a e.g. by using the electron beam lithography device, so as to form convex/concave patterns for forming the protrusions 31 and 32. This makes it possible to shorten a time period required for manufacturing the stamp 24, thereby reducing manufacturing costs of the same.

On the magnetic recording medium 3, the discrete tracks 4 are formed using the convex/concave pattern which is formed in the resin layer 63 by the convex/concave pattern-forming method, so that the discrete tracks 4 in the entire convex/concave pattern-forming area 64 are formed to be substantially uniform in height (uniform in depth of the grooves separating the tracks) without being deformed or peeled even in the outer and inner peripheral portions 64b and 64c of the convex/concave pattern-forming area 64. Therefore, according to the magnetic recording medium 3, it is possible to positively prevent occurrence of a recording error.

It should be noted that the present invention is not limited to the above-described embodiment. For example, although the stamp 24 having the protrusions 32 formed in both of the outer area 27 and the inner area 28 is employed in the embodiment, this is not limitative, but it is also possible to employ a stamp having the protrusions 32 formed in only one of the outer area 27 and the inner area 28.

Figure 16:
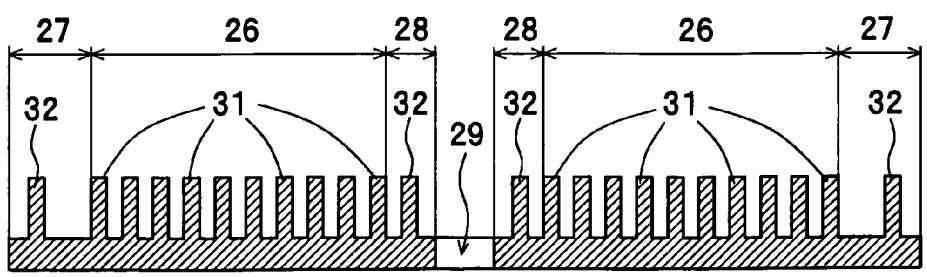
FIG. 16 is a cross-sectional view of another stamp.
Figure 17:
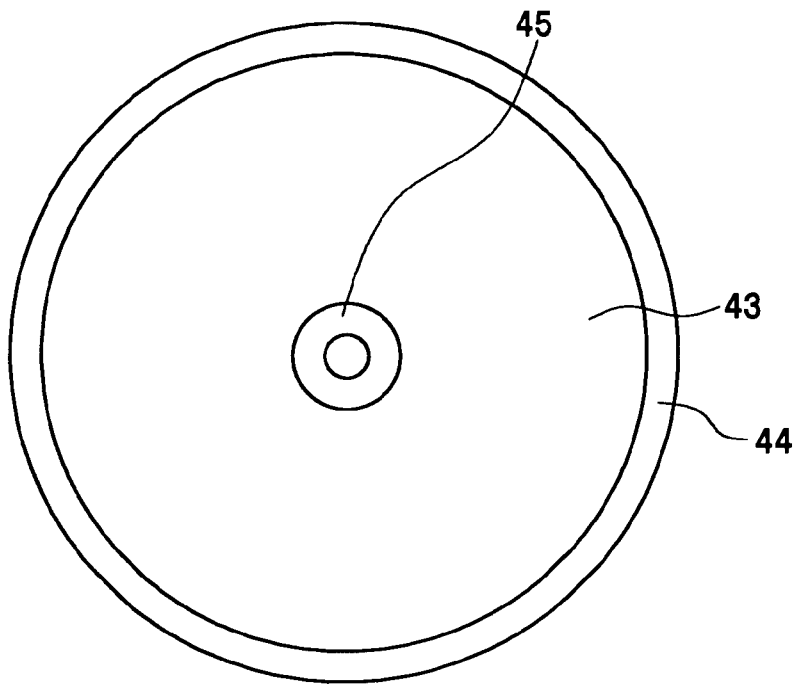
FIG. 17 is a plan view of a conventional stamp.
Figure 18:
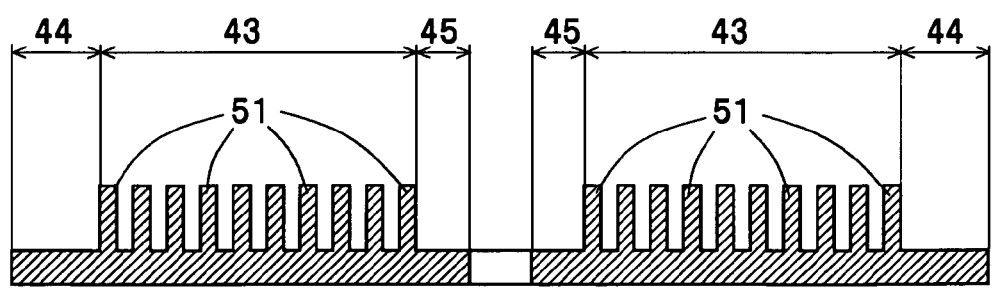
FIG. 18 is a cross-sectional view of the conventional stamp.
Figure 19:
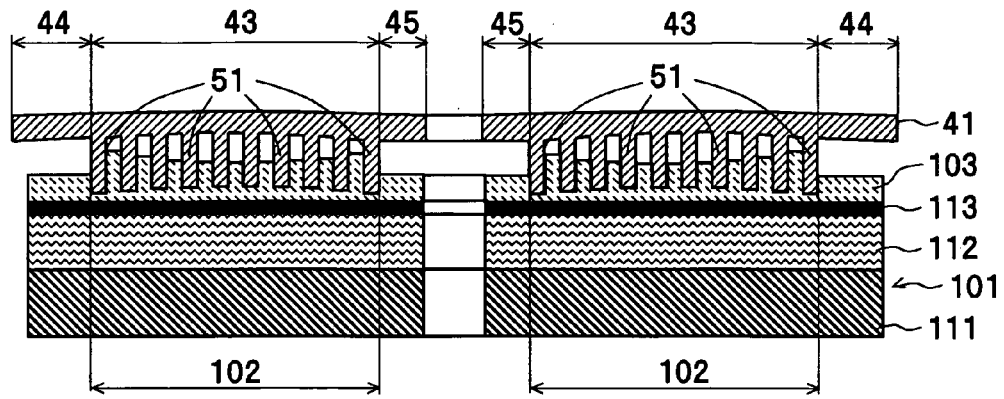
FIG. 19 is a cross-sectional view of the conventional stamp in a state having been pressed against a resin layer.
Figure 20:
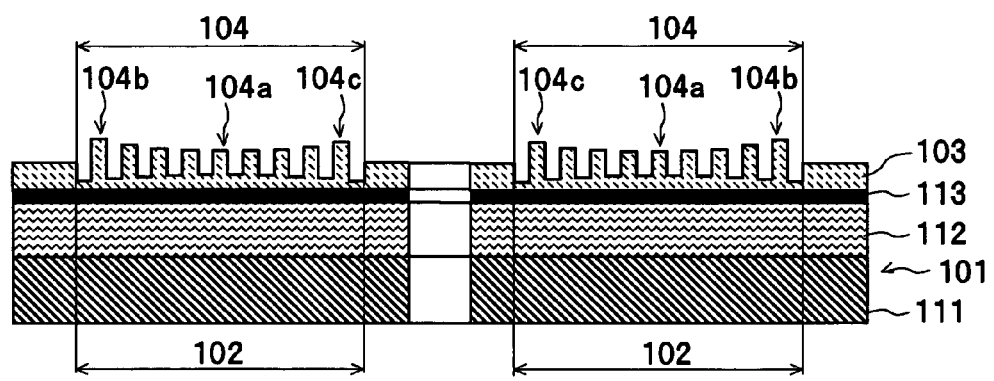
FIG. 20 is a cross-sectional view of a disk-shaped substrate having an convex/concave pattern formed in the resin layer by using the conventional stamp.
Figure 21:
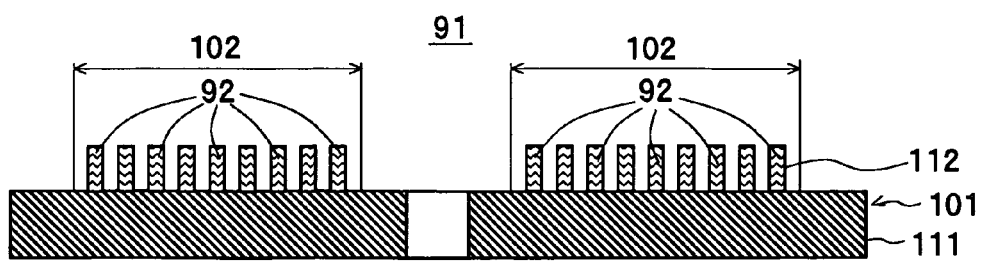
FIG. 21 is a cross-sectional view of a conventional magnetic recording medium.

Further, although in the above-described embodiment, the protrusions 32 are formed in the entire outer area 27 and the entire inner area 28, it is possible to employ a stamp 81 that has a peripheral edge portion with a predetermined width which is not formed with any protrusions 32, at a location radially outward (or inward) of the annular area 26, as shown in FIG. 16. Even with this arrangement, when the stamp 81 is pressed against the resin layer 63, pressure applied to the resin layer 63 can be dispersed between the convex/concave pattern-forming area 64, the outer peripheral part 65, and the inner peripheral part 66, of the resin layer 63, which makes it possible to form a convex/concave pattern having recesses substantially uniform in depth. Further, since the area for forming the protrusions 32 can be reduced, the processed area of the stamp 81 can also be reduced in forming the stamp 81 by an amount corresponding to the reduced area. This makes it possible to reduce costs for processing the stamp 81, thereby reducing manufacturing costs of the magnetic recording media 3 as well.

Furthermore, although the stamp 24 has the protrusions 31, 31, ... concentrically formed in the annular area 26, this is not limitative, but the present invention can also be applied to a stamp having a protrusion spirally formed (the protrusions are accurately expressed by "a single protrusion" since they are continuously formed). In this case, concentric protrusions 32 can be formed in one or both of the outer area 27 and the inner area 28, or spiral protrusions can be formed in one or both of the outer area 27 and the inner area 28 in place of the concentric protrusions 32. Further, alternatively, it is possible to form the spiral protrusions in only one of the outer area 27 and the inner area 28, and the concentric protrusions in the other. Moreover, although in the above described embodiment, the protrusions 32 identical in shape and pitch to the protrusions 31 are formed in the outer area 27 and the inner area 28, this is not limitative, but protrusions different in shape can also be formed. Further, the protrusions 32 can be formed at a different pitch from that of the protrusions 31. In this case, for example, it is possible to form the protrusions in the outer area 27 and/or the inner area 28 such that the width of a protrusion is increased as it is closer to the outer periphery of the stamp.

What is claimed is:

1. A convex/concave pattern-forming stamp having on a surface thereof a predetermined annular area formed with convex/concave pattern-forming protrusions for forming a convex/concave pattern in a resin layer on a surface of a substrate by being pressed against the resin layer, wherein:
    the annular area is defined to have approximately the same size as a track-forming area of a magnetic recording medium;
    pressure-dispersing protrusions for dispersing pressure applied to the resin layer when the convex/concave pattern-forming protrusions are pressed against the resin layer are formed in at least one of an outer area located radially outward of the annular area and an inner area located radially inward of the annular area; and
    the pressure-dispersing protrusions are formed such that a width of each of the pressure-dispersing protrusions increases towards an outer periphery of the stamp.

2. A convex/concave pattern-forming stamp as claimed in claim 1, wherein the pressure-dispersing protrusions are formed in both of the outer area and the inner area.

3. A convex/concave pattern-forming stamp as claimed in claim 1, wherein the pressure-dispersing protrusions are formed at a location spaced from the annular area by a predetermined radial distance.

4. A method of forming a convex/concave pattern, comprising:
    forming a resin layer on a surface of a substrate; and
        pressing against the resin layer a convex/concave pattern-forming stamp that has convex/concave pattern-forming protrusions formed in a predetermined annular area on a surface thereof, and pressure-dispersing protrusions formed in at least one of an outer area located radially outward of the annular area and an inner area located radially inward of the annular area, the annular area is defined to have approximately the same size as a track-forming area of a magnetic recording medium;
    to thereby form a convex/concave pattern in the resin layer by the convex/concave pattern-forming protrusions wherein the pressure-dispersing protrusions are formed such that a width of each of the pressure-dispersing protrusions increases towards an outer periphery of the stamp.

* * * * *